(12) United States Patent
Barney et al.

(10) Patent No.: US 8,133,156 B2
(45) Date of Patent: Mar. 13, 2012

(54) SYSTEM AND METHOD FOR CONTROLLING MACHINE COMPONENT TEMPERATURES

(75) Inventors: Dennis A. Barney, Morton, IL (US);
Charles W. Birchenough, Morton, IL (US); James B. McKnight, Decatur, IL (US); Brian J. Oleson, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 1152 days.

(21) Appl. No.: 11/941,227

(22) Filed: Nov. 16, 2007

(65) Prior Publication Data
US 2009/0131222 A1    May 21, 2009

(51) Int. Cl.
*B60W 10/02* (2006.01)

(52) U.S. Cl. ........... 477/174; 477/53; 477/57; 192/3.29; 192/3.34

(58) Field of Classification Search ............... 477/52–54, 477/57, 58, 97, 98, 168, 169, 174, 180; 192/3.23, 192/3.26, 3.28; 60/337; 237/5, 12.3 R, 12.3 B, 237/12.4, 28, 34
See application file for complete search history.

(56) References Cited

U.S. PATENT DOCUMENTS

| | | | |
|---|---|---|---|
| 3,662,819 A | | 5/1972 | Hartline, Jr. |
| 4,062,431 A | * | 12/1977 | Jameson ...................... 192/3.33 |
| 5,050,717 A | * | 9/1991 | Shibayama .................... 477/64 |
| 6,135,065 A | | 10/2000 | Weathers et al. |
| 6,374,780 B1 | | 4/2002 | Rutyna et al. |
| 7,267,633 B2 | | 9/2007 | Hitch et al. |
| 2005/0288150 A1 | * | 12/2005 | Hitch et al. .................... 477/98 |
| 2006/0223673 A1 | * | 10/2006 | Centlivre et al. ............. 477/181 |
| 2008/0032860 A1 | * | 2/2008 | Holtz et al. .................... 477/62 |

* cited by examiner

*Primary Examiner* — David D Le
*Assistant Examiner* — Huan Le
(74) *Attorney, Agent, or Firm* — Leydig, Voit & Mayer

(57) ABSTRACT

The temperature of a machine component is controlled by transferring heat generated by a torque converter under restricted conditions to the component. The machine includes a circulating fluid system configured to transfer heat from the torque converter to the remotely positioned machine component. A controller is configured to sense the temperature of the component, and to restrict motion of the torque converter turbine when the sensed temperature is below a desired temperature. Heat generated by the torque converter under the restricted condition is transferred through the circulating fluid system to the remote component, such as the machine power source, to control the temperature thereof.

20 Claims, 4 Drawing Sheets

SYSTEM AND METHOD FOR CONTROLLING MACHINE COMPONENT TEMPERATURES

TECHNICAL FIELD

This disclosure relates generally to fluid temperature control systems, and, more particularly, to systems for increasing or maintaining the temperature of a machine component by restricting movement of the torque converter turbine during idle conditions, and transferring heat generated by the torque converter under the restricted condition to the component.

BACKGROUND

Conventional mobile machines are known to include a power source, such as a diesel or gasoline powered engine, that is operatively connected through a drivetrain to traction devices for propulsion. To control the temperature of the engine and other components during operation, such machines may also include a liquid cooling system generally consisting of a pump fluidly connected through one or more conduits to circulate coolant through a power source coolant jacket and a heat exchanger. The heat exchanger may be associated with a cooling fan that provides a flow of air to draw heat from the exchanger, thereby providing more effective cooling. Other machine components, such as a transmission and torque converter fluid cooler, hydraulic system or brake fluid cooler, and engine oil cooler, may be fluidly connected to the same cooling system to control the temperature of fluids associated therewith. Thermal management during engine warm-up or under idle conditions is typically controlled by a thermostat connected to a by-pass conduit that restricts the flow of coolant from the system to the heat exchanger. However, other machine components connected to the system may continue to draw heat away from the power source.

At initial start-up and during idling, particularly in cold environmental conditions, the initial responsiveness and performance of the power source and other machine systems can suffer. More importantly, however, it is known that at low temperatures, even at room temperature, carbon deposits may begin to form on injectors, valves and other engine components. This can affect engine performance and efficiency, decrease operating life, increase servicing and operating costs, and increase machine downtime. Other systems may also suffer under cold conditions. For example, increased viscosity of the various fluids may result in lack of responsiveness. In particular, hydraulic systems may suffer from decreased inlet pressures which may result in cavitation damage, and lack of responsiveness. Transmissions may suffer from reduced lubrication of bearings and other components, slow shifting and movement of parts, again affecting performance and potentially leading to premature wear and damage to machine components.

To address the problems associated with cold start and idle conditions, it is known to provide an elevated idle that increases engine RPMs at low temperatures when the machine is not moving. More specifically, a temperature sensor is associated with the engine to provide a signal indicative of the engine coolant temperature, the signal being provided to a controller configured to increase engine idle speed, while in a parked or neutral operating condition, until a desired temperature is achieved. However, this strategy may not be sufficient to maintain the temperatures necessary to avoid the above problems, particularly those associated with carbon build-up, and may result in excess noise and lower fuel economy.

U.S. Pat. No. 7,267,633 to Hitch and Kluemper discloses selectively controlling the state of a fluid coupling in a motor vehicle powertrain during neutral idle operation of the engine to increase engine temperatures. The fluid coupling includes an output member that is selectively grounded through transmission clutches under specified enable conditions to impose an engine load for raising the engine operating temperature. The clutches are released to resume normal operation of the powertrain when the enable conditions are no longer met or an estimate of the fluid temperature of the coupling reaches or exceeds a predefined temperature. However, this strategy relies purely on increasing the load on the engine, which may increase noise and lower fuel economy. Moreover, the temperature controls that protect the fluid coupling from overheating may place limitations on the heating capacity of the system. That is, there may be conditions under which the desired engine temperature has not been attained, while the clutches have been disengaged because the temperature of the fluid coupling has exceeded the predefined temperature. In general, it would be desirable to improve the efficiency of such a system, increasing heating capacity and decreasing overall fuel consumption and noise.

The present disclosure is directed to overcoming one or more of the problems set forth above.

SUMMARY

In one aspect, provided is a method of controlling the temperature of a machine component for a machine having a power source that is operatively coupled to a torque converter, and a circulating fluid system configured to transfer heat generated by the torque converter to a remotely positioned machine component. The temperature of the remote component is controlled by sensing the temperature thereof, restricting movement of the turbine of the torque converter when the sensed temperature is below a desired temperature, and transferring heat generated by the torque converter through the circulating fluid system to the machine component.

In another aspect, a machine is provided that includes a power source operatively coupled to a torque converter having a turbine, and a circulating fluid system configured to transfer heat from the torque converter to a remotely positioned machine component. A controller is provided that is configured to receive a signal indicative of a temperature of the component, and to restrict motion of the turbine if the component temperature is below a desired temperature.

In yet another aspect, provided is a machine having a power source coupled to a torque converter, the torque converter having a turbine configured for rotation to transmit power to a transmission. The machine also includes a power source cooling system configured to transfer heat from the torque converter to the power source, a controller being configured to receive a signal indicative of the temperature of the power source and to restrict motion of the turbine if the power source temperature is below a desired temperature.

These and other aspects of the present disclosure will become apparent to those skilled in the art upon reading the following detailed description in connection with the drawings and appended claims.

DETAILED DESCRIPTION

The present disclosure relates to a system and method for controlling component and fluid temperatures for any mobile machine that includes a power source operatively connected through a torque converter to a transmission. The machine may be, for example, an off-highway truck such as that employed in mining or quarry operations. However, the term "machine" may refer to any mobile machine that performs some type of operation associated with an industry such as mining, construction, farming, transportation, or any other industry known in the art. For example, the system may be used with an earth moving machine such as a wheel loader, excavator, dump truck, dozer, tractor scraper, backhoe, motorgrader, or the like.

Figure 1:
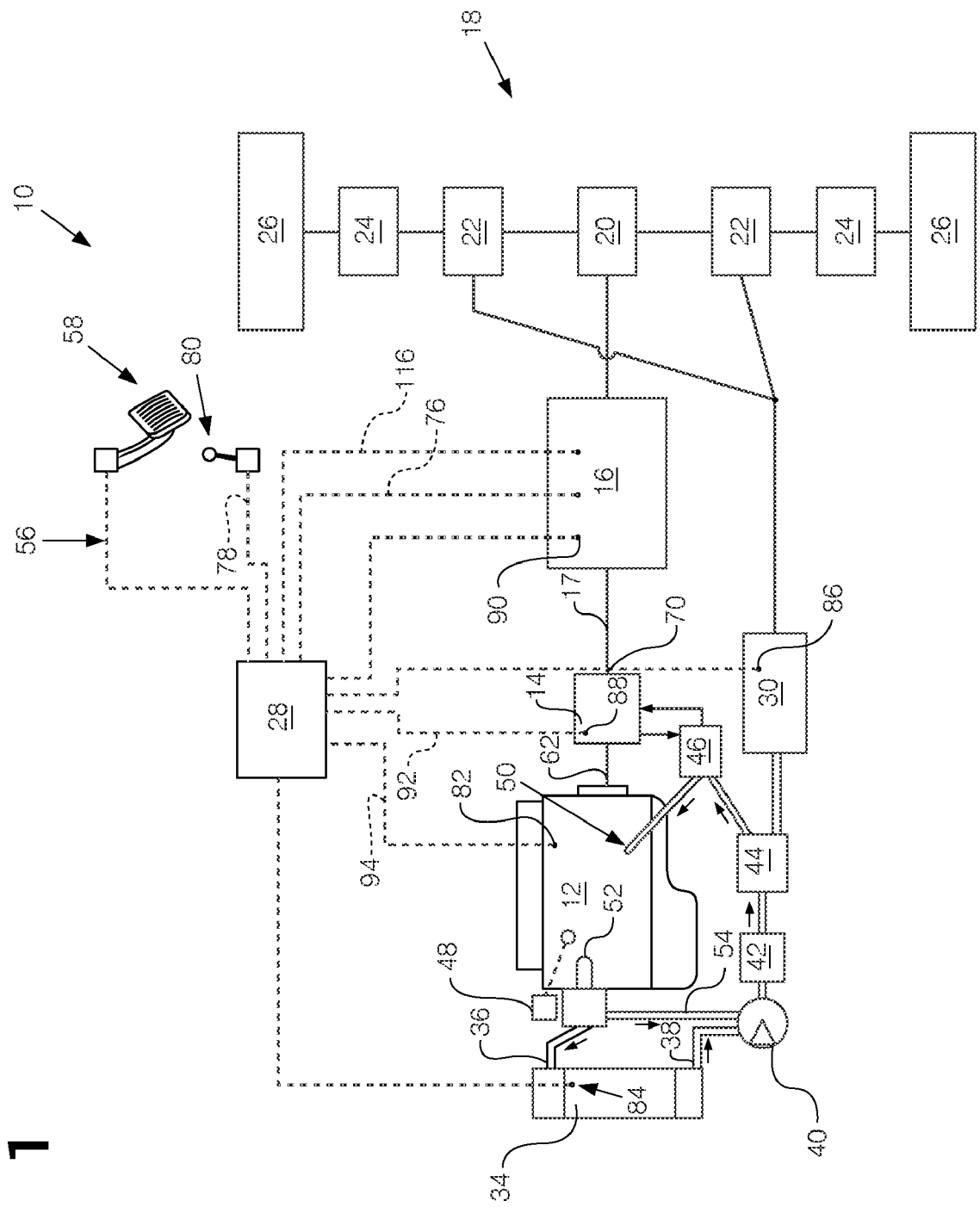
FIG. 1 is a diagrammatic view of a thermal management system in accordance with one embodiment of the present disclosure.

Referring now to FIG. 1, a thermal management system 10 for a machine (not shown) is shown. The machine (not shown) includes a powertrain with a power source 12, such as a diesel or gasoline powered engine, that is drivingly connected through a torque converter 14, transmission 16, and axle assembly 18 that may include a rear differential 20 and final drives 24, to traction devices 26 in a conventional manner. Brake assemblies 22 may also be incorporated into the axle assembly 18 as known in the art.

The power source 12 is also of a conventional design, and may include an internal combustion engine such as, for example, a diesel engine, a gasoline engine, a gaseous fuel-powered engine such as a natural gas engine, or any other engine apparent to one skilled in the art. Power source 12, as stated above, is configured to produce a power output that is directed to the torque converter 14.

Torque converter 14 is a hydraulic device configured to fluidly couple power source 12 to transmission 16. The torque converter 14 may allow power source 12 to rotate somewhat independently of transmission 16. The amount of independent rotation between the power source 12 and transmission 16 may be varied by modifying operation of the torque converter 14. Again, the torque converter 14 may be of a conventional design.

Figure 3:
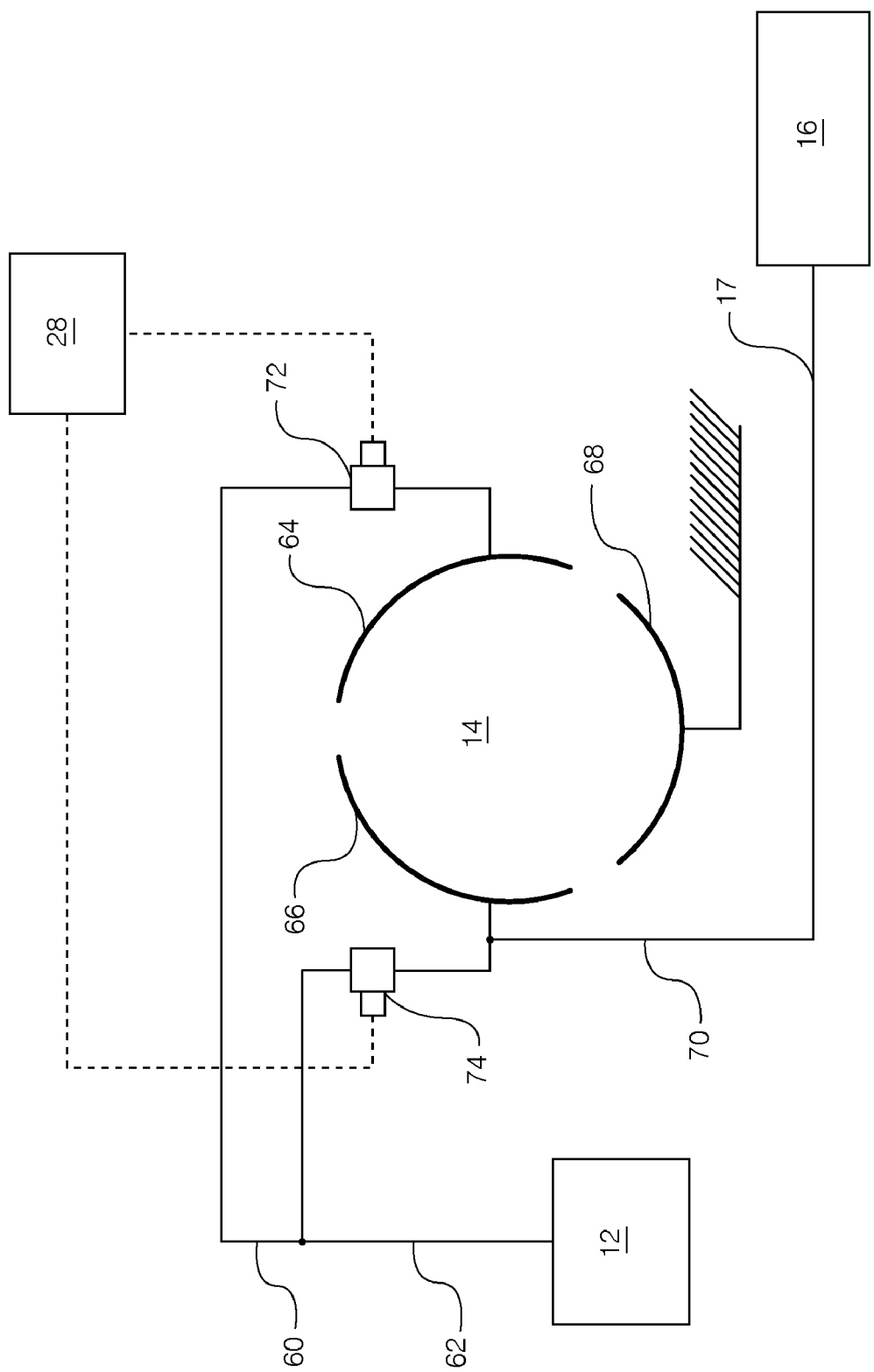
FIG. 3 is a diagrammatic view of a torque converter.

For example, referring to FIG. 3, torque converter 14 may include a housing 60 that is coupled to a power source 12 flywheel or output shaft 62 to transmit power to the torque converter 14. The rotating housing 60 turns an impeller 64 that directs fluid to the blades of a turbine 66, causing the turbine to rotate in an opposite direction. The turbine 66 directs the fluid to stator 68 which is held against rotation in an opposite direction of the turbine 66 by a one-way clutch (not shown). The stator 68 redirects most of the torque converter fluid back to impeller 64, thereby multiplying the torque output. The turbine 66 is connected to a torque converter output shaft 70, thereby transmitting power to the transmission 16.

A disk-type input or impeller clutch 72 may be provided to control the coupling of the power source 12 to the impeller 64. A disk-type lock-up clutch 74 may also be provided for selectively coupling the rotating housing to the turbine 66 for a direct mechanical connection that effectively by-passes the torque converter 14.

Referring again to FIG. 1, transmission 16 may be configured to transmit power from power source 12 to driven traction devices 26 at a range of output speed ratios. Transmission 16 may embody a hydraulic transmission having one or more pumps and hydraulic motors, a mechanical transmission having a mechanical gear train, a hydromechanical transmission having both hydraulic and mechanical components, an electric transmission having a generator and one or more electric motors, or any other suitable transmission known in the art. A transmission input shaft 17 connects transmission 16 to torque converter 14 output shaft 70. While discussed as separate components, the input shaft 17 and output shaft 70 may refer collectively to a single shaft. In this manner, power generated by power source 12 may be transmitted through transmission 16 to traction devices 26. In accordance with the present disclosure, despite the variations in transmission type, the transmission 16 may include a clutch or similar mechanism for limiting rotation of the input shaft 17, "restricting" the turbine 66, thereby increasing the heat generated by the torque converter 14 as discussed in further detail below. "Restriction" of the turbine may refer to either complete or partial restriction.

Traction device 26 may include wheels disposed on opposite sides of a machine. For example, an off-highway truck (not shown) may include a single rear differential 20 and axle assembly 18 operatively connected to opposing rear wheels 26 or wheel sets. Alternatively, driven traction devices 26 may include tracks, belts or other traction devices known in the art. As shown, the axle assembly 18 may include a differential gear assembly 20 configured to divide power from power source 12 between wheels 26 located on either side of the machine. Differential gear assembly 20 may allow wheels 26 on one side of the machine to turn faster than those located on an opposite side thereof. Final drives 24 may be operatively connected to the differential 20 for further modification of the output speed ratio to the traction devices 26 in a conventional manner. It is contemplated that the differential gear assembly 20 and/or final drive 24 may be omitted if desired. Alternatively, some machines may include more than one axle assembly 18 connected to the transmission 16, for example, through a transfer case (not shown).

Brake assemblies 22 are configured to retard motion of the machine and may be operatively associated with the axle assembly 18 and/or with one or more traction devices 26. In one embodiment, brake assemblies 22 each include a plurality of hydraulically actuated brakes (not shown) that are associated with the axle shafts (not shown) to provide braking capabilities for the machine in a conventional manner. In another embodiment (not shown), the brake assemblies 22 include a hydraulic pressure-actuated wheel brake, such as, for example, a disk brake or a drum brake disposed proximal the traction devices 26. The brake assemblies 22 may be controlled using a brake pedal (not shown) which in turn directs pressurized fluid through hydraulic system 30 to the brake assemblies 22 for actuation and/or release thereof.

Figure 2:
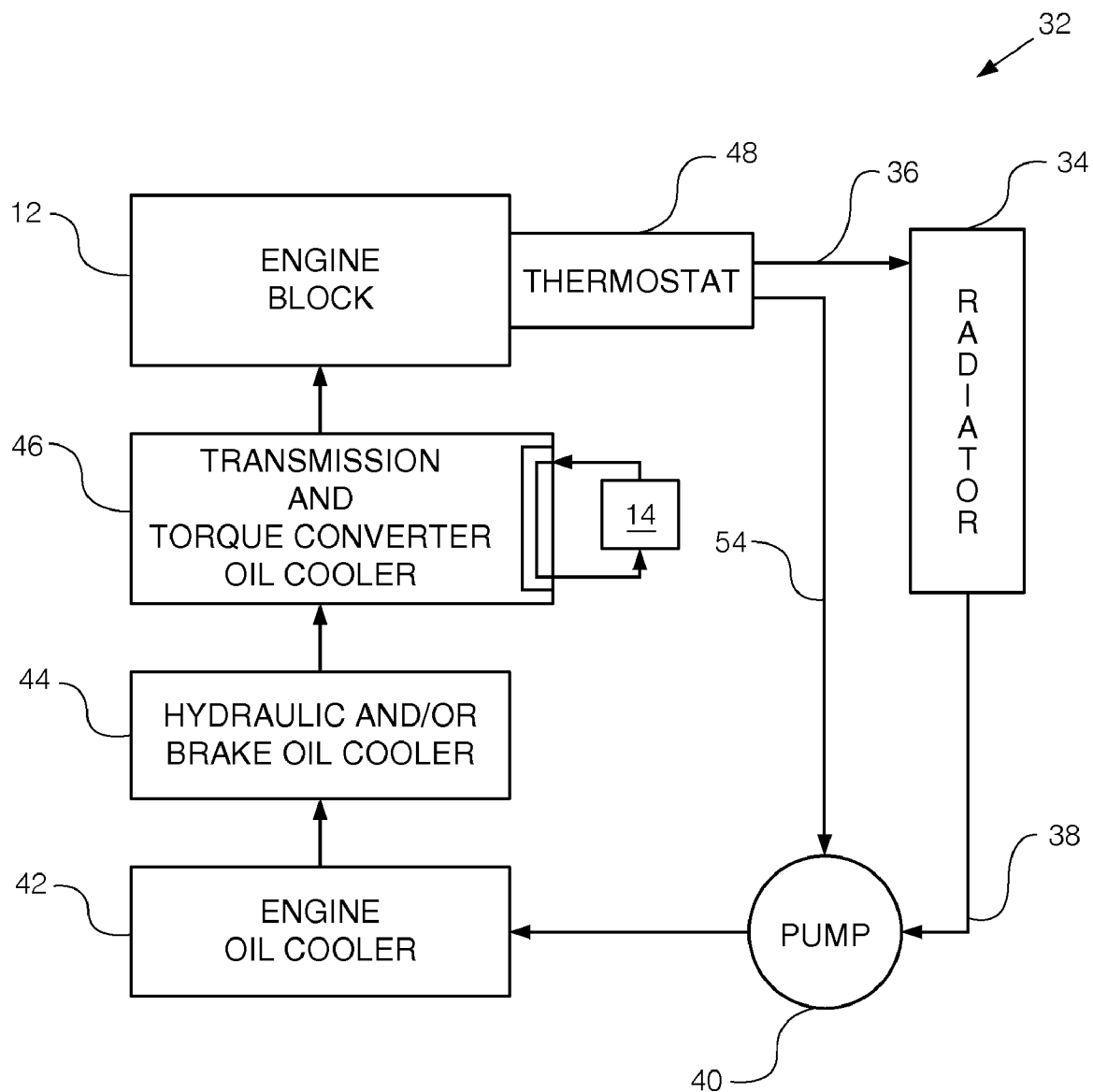
FIG. 2 is diagrammatic view of the flow of coolant in accordance with FIG. 1.

Referring to FIGS. 1 and 2, the thermal management system 10 also includes a power source cooling system 32 that generally includes a pump 40 fluidly connected through various conduits to circulate coolant through the power source 12 and/or other machine components. In one embodiment, the pump 40 directs a flow of coolant through an engine oil cooler 42, hydraulic and/or brake fluid cooler 44 (associated with hydraulic system 30), transmission and torque converter fluid cooler 46, and into a cooling jacket (not shown) associated with the power source 12 through inlet 50 as illustrated by the directional arrows. Coolant passes through outlet 52 and through upper conduit 36 to heat exchanger 34, returning to the pump 40 via lower conduit 38. A thermostat 48 may be provided that restricts the flow of coolant from the power source 12 to the heat exchanger 34 by opening a control valve (not shown) to by-pass conduit 54, returning coolant directly to the pump 40. Torque converter fluid cooler 46 is an "in-line" heat exchanger that allows cooling fluid to pass through or around the torque converter lubricating/cooling fluid while remaining isolated therefrom, separated by materials/components designed to facilitate heat transfer between the coolant and torque converter fluid.

Controller 28 is a computer including a microprocessor, or multiple mircoprocessors, which may be one of many readily available computers capable of processing numerous instructions. However, other suitable controllers are known in the art, any one of which could be readily used in connection with alternative embodiments of the present disclosure. A specific program code can be readily and easily written from the flowchart shown in FIG. 4, in the specific assembly language or microcode for the selected microprocessor.

In one embodiment, the controller 28 not only controls the thermal management system 10, but also serves to control, monitor, and/or diagnose other machine systems. For example, controller 28 may also serve as a general power source controller, cooling system controller, or general machine controller. As such, the controller 28 may be adapted to receive sensor and other input from a variety of sources throughout the machine, in addition to input associated with the thermal management system 10.

Figure 4:
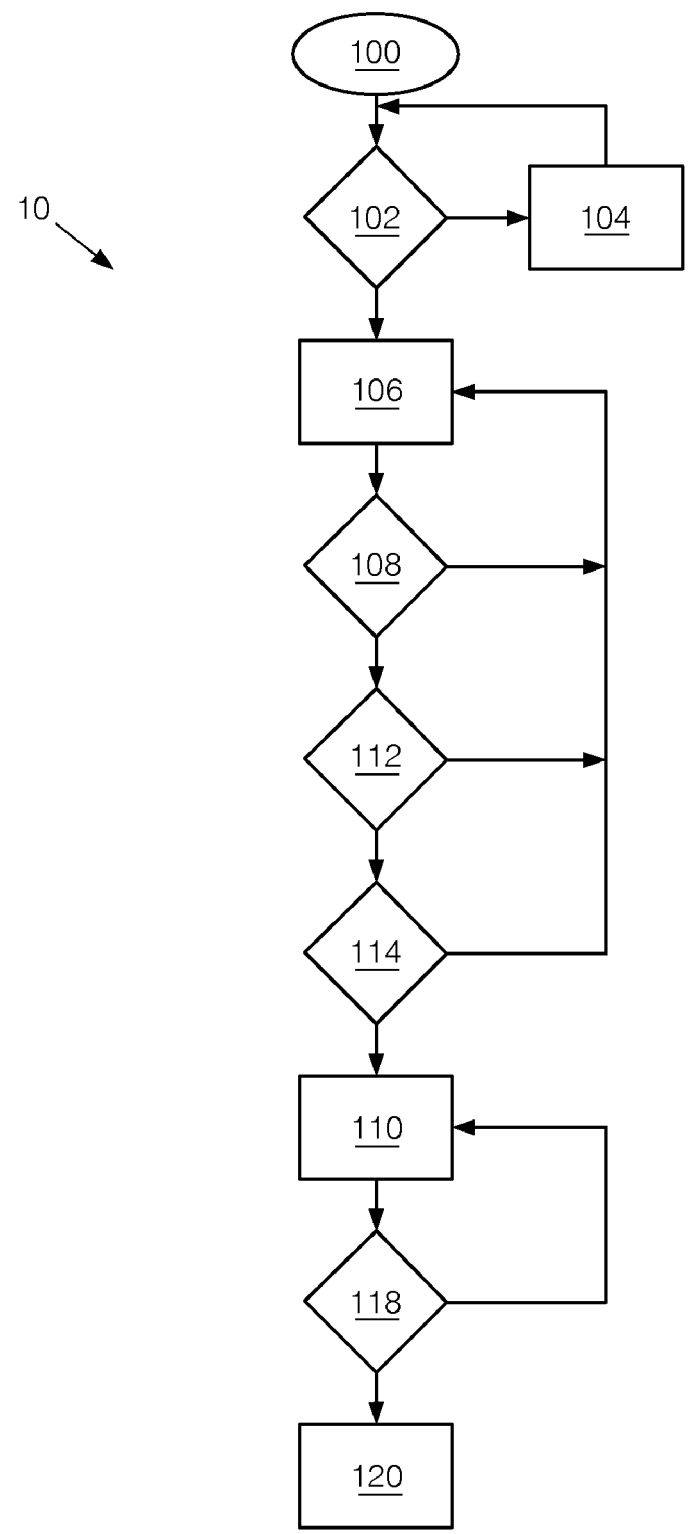
FIG. 4 is a flow chart demonstrating operation of one embodiment of a thermal management system of the present disclosure.

The thermal management system 10 can be employed to control the temperature of various machine components, including, for example, power source, hydraulic, brake system components, and the like, by transferring heat generated by the torque converter under "restricted" conditions through, for example, the torque converter fluid cooler 46. This may include various fluid components, such as engine coolant, hydraulic and brake fluids, transmission fluids, and engine lubricants. This may be particularly useful under extreme cold ambient conditions where performance of these various machine components may suffer due to increased fluid viscosities. Moreover, the system may be employed to limit carbon build-up that may occur on injectors, valves and other components at low temperatures, even under room temperature conditions. Referring to FIG. 4, operation of one embodiment of the thermal management system 10 will hereafter be described.

System initiation 100 may begin when the machine is turned on, for example, by the operator starting the power source 12 through a keyed or keyless ignition switch typically associated with an operator station (not shown).

The system may then perform a check 102 as to the operational status of the machine. Generally, it is not desirable to employ the heating strategy when the machine is in operation. Moreover, the torque converter should be released for normal machine operations. Accordingly, the controller is first configured to determine whether the machine is "idling," in which the transmission is not engaged to transmit power, for example, through the transmission output shaft, for propulsion (in, for example, a neutral or parked position depending on the machine). In one embodiment, the controller 28 may be configured to receive a transmission signal 76 from a sensor associated with transmission 16, and/or a signal 78 from a transmission operator control 80, such as a shift lever, indicative of the transmission gear selection. Based upon this signal, the controller 28 determines whether the machine is idling. This check 102 may include a timing mechanism 104, wherein the machine is determined to be idling when the desired condition is met for a desired period of time, for example, 30 seconds.

Once it has been determined that the machine is idling, other sensors may be employed in conjunction therewith to ensure that the machine is not "in operation." For example, in one embodiment, the controller 28 is configured to receive a throttle control signal 56 from a sensor associated with a throttle controller 58, such as a throttle pedal. If the throttle controller is used by an operator, or is used within a predetermined period of time, the controller 28 may determine that the machine is in operation, and that the heating strategy should not be employed.

Other signals may also be received by the controller 28 and used to indicate operational status of the machine. For example, an engine speed sensor (not shown) may be employed, and where the engine speed exceeds a desired rpm, the system 10 determines that the machine is in operation. Other sensors employed in this determination may include, without limitation, position sensors associated with various hydraulic actuators and brakes, and/or speed sensors associated with the axle assemblies 18 or traction devices 26. If the controller 28 determines that the machine is in operation based upon such sensors, the system 10 may be configured to perform this determination at periodic intervals 104, for example, every 2-5 minutes.

Controller 28 may also be configured to receive various signals 106 indicative of the temperature status of the power source 12 or other machine components. This may include, for example, temperature sensors 82, 84, 86, 88, and 90 associated with the power source 12, heat exchanger 34, hydraulic system 30, torque converter 14 and/or transmission 16, respectively. "Sensing" the temperature of a machine component may be accomplished, for example, by sensing the temperature of the component itself, e.g., the temperature of a housing, engine block, or other structure of the component, or by measuring the temperature of a fluid or gas associated with the component.

In one embodiment, the controller 28 is configured to receive a temperature signal 94 indicative of the power source 12 coolant temperature, and to perform a low temperature check 108, determining whether the coolant/power source temperature is below a threshold level, for example, below 70 degrees Celsius (158 degrees Fahrenheit). If the temperature of the power source 12 coolant is below the desired temperature, the system may proceed to initiate restriction 110 of the torque converter 14. Otherwise, the system may proceed back to 106.

While the system 10 is described herein as being employed to manage the temperature of a power source 12, it will be appreciated by those of skill in the art that the system may be employed for thermal management of other fluids/components, such as brake or hydraulic components 30, engine lubrication components, and the like, in which case, the temperature check 106 would relate to the temperatures associated with these systems as opposed to, or in conjunction with, the power source 12 coolant temperature. For example, in another embodiment (not shown), a fluid circulating system may be associated with a remote component such as a hydraulic, brake, electrical or drivetrain component. The phrase "remotely positioned" refers to the fact that heat is being transferred substantially indirectly from the torque converter to a separate component through an intermediate circulating fluid system such as a machine cooling system. For example, in some machines, the torque converter may share a common housing and lubricant/coolant supply with a transmission, in which case, the transmission is not considered "remote" from the torque converter, as heat can be transferred directly from the torque converter to the transmission components through the common lubricating/coolant fluid.

In the system shown in FIGS. 1-2, the power source cooling system 32 is shown as the primary mechanism of heat transfer from the torque converter 14 to the power source 12 and other components. However, it should be appreciated that any circulating fluid system could be employed to transfer heat from the torque converter. The circulating fluid system may be configured with a device similar to the in-line torque converter fluid cooler 46 that acts as a heat exchanger between the circulating fluid and the torque converter fluid, thereby transferring heat generated by the torque converter to the associated component. In yet another embodiment, the circulating fluid system may include a fluid jacket that surrounds the torque converter, or is integral to a portion of the torque converter housing, wherein heat is transferred directly to the circulating fluid without involving a separate torque converter fluid cooler/heat exchanger. Additional arrangements should be readily apparent to those of skill in the art based on the present disclosure.

Controller 28 may also receive a temperature signal 92 from the torque converter 14 to insure that the torque converter fluid temperature has not exceeded a desired maximum temperature value, which may result in premature wear or damage to the torque converter 14 and other machine components. Thus, a torque converter maximum temperature check 112 may be performed by the controller 28. If the desired torque converter temperature is above the desired maximum level, for example, 124 degrees Celsius (255.2 degrees Fahrenheit), the system may revert back to 106 and continue to perform this check until the temperature lowers below the threshold, as a prerequisite to initiating restriction 110.

The controller 28 may then perform a fault check 114, which determines whether the conditions determined in the operational status check 102, temperature check 108 and torque converter temperature check 112, have persisted for a desired period of time, for example, 5-10 minutes. In an alternative embodiment, this time period may be less when the controller 28 determines that the machine has just been turned on, for example, one minute or less, as opposed to after the machine has been in operation, and then goes into an idle mode, in which case the time period may be from 5 to 10 minutes before the controller 28 initiates restriction 110.

Typically, in park or neutral position, the transmission input shaft 17, connected torque converter output shaft 70 and turbine 66 are free to rotate, which typically occurs as power is transferred from the idling power source 12 through the fluid coupling. However, the transmission 16 is not engaged to transmit that power further along the drivetrain. Once controller 28 determines that a cold-temperature condition exists and that the machine is idling, the controller 28 provides a control signal 116 to the transmission 16 to initiate "restriction" of the transmission input shaft 17, through, for example, one or more clutches (not shown) associated therewith. Complete restriction causes a stall condition that prevents rotation of torque converter output shaft 70 and turbine 66 of the torque converter 14. When power passes from the power source 12 through the flywheel and/or output shaft 62 and rotationally engaged impeller 64, fluid flow is directed over the now stationary turbine 66. A pressure drop is created by the fluid flow passing over the stationary turbine 66 blades. This pressure drop generates heat that is conveyed from the torque converter 14 to the torque converter fluid cooler 46, and from the torque converter fluid cooler 46 to the cooling system 32. Thus, the heat generated by the torque converter 14 is transferred through the cooling system 32 to the power source 12, hydraulic system 30, engine oil cooler 42, and other components.

The "restricting" condition as it is applied herein may refer to any condition that restricts the movement of the turbine 66 to generate heat. In one embodiment described above, complete stall is achieved, but less than a complete stall may still generate heat for thermal management. Moreover, one of skill in the art will appreciate that "restricting" of the turbine may be achieved in a number of ways, for example, by the strategy above involving clutches associated with the transmission 16, or by clutches or other mechanisms associated with the torque converter 14, torque converter output shaft 70, and/or transmission input shaft 17.

The above strategy should not be confused with the conventional torque converter lock-up clutch 74, which provides a mechanical connection between the power source output shaft 62 and torque converter output shaft 70, which bypasses the fluid connection. The torque converter lock-up clutch 72 is disengaged in the above strategy so that heat can be generated through rotation of the impeller 64 relative to the stationary turbine 66.

The thermal management system 10 may further include a strategy of increasing power source 12 idle speed in combination with restriction of the torque converter. For example, the controller 28 may determine that the power source coolant temperature is below a particular threshold and may then be configured to increase engine idle speed in response. A combination of these two strategies may be employed, for example, where, over a first temperature range, idle speed is increased, after which idle speed is lowered, and restriction is initiated 110, or vice-versa. Obviously, the temperature ranges over which one or the other strategy are employed may be overlapping or coextensive.

When the machine is in operation, that is, where an operator is using the machine to perform work or moving the machine from one location to another, sufficient heat will typically be generated by the loads placed on the power source to alleviate the problems associated with cold start and idling. Moreover, the operator will require that the restriction 110 be disengaged for movement of the machine. Accordingly, at step 120, the turbine 66, torque converter output shaft 70 and/or transmission input shaft 17 is released if the controller 28 determines 118 that the machine is in operation, by for example, receiving an increased throttle signal 56, or signal from either the transmission 16 or the transmission operator control 80. At the same time, the engine idle speed may be returned to normal. Other signals indicating operation of the machine, such as, for example, traction device speed sensors, axle assembly speed sensors, or hydraulic actuator sensors may also serve to deactivate the heating strategy, releasing the torque converter and/or resetting the idle speed.

In addition to monitoring operating conditions, at step 118 the controller 28 may continue to monitor the fluid temperature associated with component being heated, such as the temperature of the power source 12, hydraulic/braking system 30, or engine lubricant cooler 42. If the temperature rises above a desired temperature, where heating is not desired, the controller 28 may also signal a return to normal mode 120. In addition, the controller 28 may continue to monitor the temperature of the torque converter as discussed previously, actuating release if the torque converter 14 temperature exceeds a maximum level as discussed previously, again returning the machine to normal mode 120. For example, the system may return to normal mode if the torque converter 14 temperature exceeds 124 degrees Celsius (255.2 degrees Fahrenheit). However, it should be noted that the disclosed system, because it transfers heat generated from the torque converter 14 to the cooling system 32 and associated components, may have an increased heating capacity over known heating strategies that merely increase engine load.

While aspects of the present disclosure have been particularly shown and described with reference to the embodiments above, it will be understood by those skilled in the art that various additional embodiments may be contemplated without departing from the spirit and scope of the present disclosure.

Industrial Applicability

The present disclosure provides a strategy for increasing and maintaining the temperature of a power source or other machine component for any machine that includes a torque converter operatively coupled to a power source for propulsion. This may include, for example, industrial machines, and particularly earth moving machines such as off-highway trucks, motorgraders, wheel loaders, dozers, tractors, excavators and the like.

By restricting movement of the torque converter turbine while the machine idling, heat is generated within the torque converter that is then transferred to the desired component via, for example torque converter lubricating/cooling fluid passed through a torque converter fluid cooler. For example, the torque converter fluid cooler may be associated with a conventional machine cooling system such that heat is transferred from the torque converter fluid to the circulating cooling system fluid, thereby warming the power source or and/or other components associated therewith. By increasing the temperature associated with machine components such as the power source, hydraulic systems and brake systems, responsiveness and performance of these components may be improved, particularly in cold operating environments. Thermal management with respect to the power source may also be particularly useful to avoid the formation of carbon deposits on injectors, valves, and other components thereof.

Other aspects, objects, and advantages of the present disclosure can be obtained from a study of the drawings, disclosure and the appended claims.

What is claimed is:

1. A method of controlling the temperature of a machine component, comprising:
   providing a machine having the machine component, a power source, a torque converter, a torque converter heat exchanger, and a circulating fluid system, the power source being operatively coupled to the torque converter, the circulating fluid system being configured to transfer heat generated by the torque converter to the machine component, and the machine component being remotely positioned relative to the torque converter;
   sensing a temperature associated with the machine component;
   restricting movement of a turbine of the torque converter if the sensed temperature is below a desired temperature;
   transferring heat generated by the torque converter to the torque converter heat exchanger;
   transferring the heat generated by the torque converter from the torque converter heat exchanger to the circulating fluid system;
   transferring the heat generated by the torque converter from the circulating fluid system to the machine component.

2. The method of claim 1, wherein the torque converter is operatively coupled through a torque converter output shaft and/or transmission input shaft to a transmission, and wherein restricting movement of the turbine includes actuating a clutch associated with the turbine, a torque converter output shaft, and/or a transmission input shaft.

3. The method of claim 1, wherein the torque converter is operatively coupled to a transmission, and restricting movement of the turbine includes actuating a clutch associated with the transmission.

4. The method of claim 1, wherein if the sensed temperature is below the desired temperature, an idle speed of the power source is increased.

5. The method of claim 1, further comprising monitoring whether the machine is idling and monitoring the sensed component temperature, and releasing the turbine if the machine is no longer idling or the component temperature rises above the desired temperature.

6. The method of claim 1, further comprising the step of sensing a second temperature associated with the torque converter, and prohibiting restriction of the turbine if the torque converter temperature is above a desired maximum torque converter temperature.

7. The method of claim 1, wherein the machine component is the power source, and the circulating fluid system is a power source cooling system.

8. The method of claim 1, further comprising determining whether the machine is idling, and restricting movement of the turbine only if the machine is idling.

9. The method of claim 8, wherein determining whether the machine is idling is dependant upon a transmission gear selection or transmission operator controller position.

10. The method of claim 8, further comprising determining whether the machine is in operation, and movement of the turbine is unrestricted if the machine is in operation.

11. The method of claim 10, wherein determining whether the machine is in operation is dependant upon an operator throttle controller position, engine speed sensor, position or motion sensor associated with a hydraulic actuator or brake, or speed sensor associated with one or more drivetrain components or a machine traction device.

12. A machine, comprising:
   a power source operatively coupled to a torque converter having a turbine;
   a torque converter heat exchanger configured to transfer heat generated by the torque converter;
   a circulating fluid system configured to transfer heat generated by the torque converter from the torque converter heat exchanger to a remotely positioned machine component, the circulating fluid system being fluidly isolated from the torque converter heat exchanger; and
   a controller configured to receive a signal indicative of a temperature of the machine component, and to restrict movement of the turbine if the component temperature is below a desired temperature.

13. The machine of claim 12, wherein the component is the power source, and the circulating fluid system is a power source cooling system.

14. The machine of claim 12, wherein the torque converter heat exchanger is an in-line torque converter fluid cooler that is fluidly coupled to the torque converter.

15. The machine of claim 12, wherein the torque converter turbine is operatively connected to the transmission through a torque converter output shaft and/or transmission input shall, a clutch being operatively associated with the turbine, torque converter output shaft, transmission input shaft or transmission, and the controller is configured to provide a control signal for engaging or disengaging the clutch to restrict movement of the turbine.

16. The machine of claim 12, wherein the controller is configured to increase machine idle speed if the component temperature is below the desired temperature.

17. The machine of claim 12, wherein the machine component is the power source, a hydraulic system component, a brake system component, or a transmission component.

18. A machine, comprising:
- a power source operatively coupled to a torque converter, the torque converter having a turbine configured for rotation to transmit power to a transmission;
- a power source cooling system configured to transfer heat generated by the torque converter to the power source; and
- a controller configured to receive a signal indicative of a temperature of the power source and to restrict movement of the turbine if the power source temperature is below a desired temperature.

19. The machine of claim 18, wherein the power source cooling system comprises a fluid circulating system having an in-line torque converter fluid cooler that is fluidly coupled to the torque converter, the in-line torque converter fluid cooler being configured to transfer heat from the torque converter to the circulating fluid system while fluid from the in-line torque converter fluid cooler remains fluidly isolated from the circulating fluid system.

20. The machine of claim 18, wherein the controller is configured to increase machine idle speed if the component temperature is below the desired temperature.

* * * * *

UNITED STATES PATENT AND TRADEMARK OFFICE
CERTIFICATE OF CORRECTION

| | | |
|---|---|---|
| PATENT NO. | : 8,133,156 B2 | Page 1 of 1 |
| APPLICATION NO. | : 11/941227 | |
| DATED | : March 13, 2012 | |
| INVENTOR(S) | : Barney et al. | |

It is certified that error appears in the above-identified patent and that said Letters Patent is hereby corrected as shown below:

In the Specification

Column 3, line 3, delete "converter;" and insert -- converter; and --.

Column 5, line 10, delete "mircoprocessors," and insert -- microprocessors, --.

Column 6, line 67, delete "lubricating/coolant fluid." and insert -- lubricating/cooling fluid. --.

Column 9, line 9, delete "Industrial Applicability" and insert -- INDUSTRIAL APPLICABILITY --.

In the Claims

Column 10, line 59, in Claim 15, delete "transmission input shall," and insert -- transmission input shaft, --.

Signed and Sealed this
First Day of September, 2015

Michelle K. Lee
*Director of the United States Patent and Trademark Office*